US011392850B2

(12) United States Patent
Gross et al.

(10) Patent No.: US 11,392,850 B2
(45) Date of Patent: Jul. 19, 2022

(54) SYNTHESIZING HIGH-FIDELITY TIME-SERIES SENSOR SIGNALS TO FACILITATE MACHINE-LEARNING INNOVATIONS

(71) Applicant: Oracle International Corporation, Redwood Shores, CA (US)

(72) Inventors: Kenny C. Gross, Escondido, CA (US); Mengying Li, La Jolla, CA (US); Alan Paul Wood, San Jose, CA (US); Steven T. Jeffreys, Boxborough, MA (US); Avishkar Misra, Sammamish, WA (US); Lawrence L. Fumagalli, Jr., Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 1205 days.

(21) Appl. No.: 15/887,234

(22) Filed: Feb. 2, 2018

(65) Prior Publication Data
US 2019/0243799 A1    Aug. 8, 2019

(51) Int. Cl.
*H04W 4/38*    (2018.01)
*G06F 17/18*    (2006.01)
(Continued)

(52) U.S. Cl.
CPC .......... *G06N 20/00* (2019.01); *G05B 19/048* (2013.01); *G06F 16/2474* (2019.01);
(Continued)

(58) Field of Classification Search
CPC ................................ H04W 4/38; G06F 17/18
See application file for complete search history.

(56) References Cited

U.S. PATENT DOCUMENTS 5,764,509 A * 6/1998 Gross ................. G05B 23/0254
706/45
5,774,379 A * 6/1998 Gross ..................... G06Q 99/00
702/71

(Continued)

OTHER PUBLICATIONS

Gross et al.; "Spectral and Reconstruction of Telemetry Signals from Enterprise Computing Systems", Proc. 2005 IEEE Intn'l Multiconference in Computer Science & Computer Eng., Las Vegas, NV (Jun. 2005).

(Continued)

*Primary Examiner* — Raymond L Nimox
(74) *Attorney, Agent, or Firm* — Park, Vaughan, Fleming & Dowler LLP

(57) ABSTRACT

The disclosed embodiments relate to a system that facilitates development of machine-learning techniques to perform prognostic-surveillance operations on time-series data from a monitored system, such as a power plant and associated power-distribution system. During operation, the system receives original time-series signals comprising sequences of observations obtained from sensors in the monitored system. Next, the system decomposes the original time-series signals into deterministic and stochastic components. The system then uses the deterministic and stochastic components to produce synthetic time-series signals, which are statistically indistinguishable from the original time-series signals. Finally, the system enables a developer to use the synthetic time-series signals to develop machine-learning (ML) techniques to perform prognostic-surveillance operations on subsequently received time-series signals from the monitored system.

20 Claims, 7 Drawing Sheets

(51) Int. Cl.
*G06N 20/00* (2019.01)
*G05B 19/048* (2006.01)
*G06F 17/14* (2006.01)
*G06K 9/62* (2022.01)
*G06F 16/2458* (2019.01)
*G06K 9/00* (2022.01)

(52) U.S. Cl.
CPC .............. *G06F 17/14* (2013.01); *G06F 17/18* (2013.01); *G06K 9/0053* (2013.01); *G06K 9/6255* (2013.01); *G06K 9/6256* (2013.01); *H04W 4/38* (2018.02)

(56) References Cited

U.S. PATENT DOCUMENTS

| | | | |
|---|---|---|---|
| 6,240,372 B1* | 5/2001 | Gross | G01R 23/16 702/179 |
| 6,839,655 B2* | 1/2005 | Gross | G05B 19/41805 702/179 |
| 6,993,462 B1* | 1/2006 | Pavlovi | G06V 40/23 703/2 |
| 2003/0014692 A1* | 1/2003 | James | G05B 23/0254 714/E11.158 |
| 2004/0002776 A1* | 1/2004 | Bickford | G05B 23/0254 700/52 |
| 2008/0256398 A1* | 10/2008 | Gross | G06F 11/00 714/47.2 |
| 2015/0058388 A1* | 2/2015 | Smigelski | G06F 17/141 708/208 |

OTHER PUBLICATIONS

Goring et al.; "Despiking Acoustic Doppler Velocimeter Data", Journal of Hydraulic Engineering, vol. 128, No. 1, Jan. 1, 2002.

* cited by examiner

SYNTHESIZING HIGH-FIDELITY TIME-SERIES SENSOR SIGNALS TO FACILITATE MACHINE-LEARNING INNOVATIONS

BACKGROUND

Field

The disclosed embodiments generally relate to techniques for analyzing time-series sensor signals from a monitored system. More specifically, the disclosed embodiments relate to a technique for synthesizing high-fidelity time-series sensor signals to facilitate machine-learning innovations for various monitored systems, such as power plants and associated critical assets in electrical transmission and distribution grids.

Related Art

Electrical generation plants, such as gas-fired or coal-fired power plants, nuclear plants and wind farms, include numerous components, such as pumps, turbines and transformers, which routinely degrade over time and fail. Degradation of these components can be costly. To reduce such costs, it is advantageous to proactively monitor components in power plants and associated power-distribution grids to detect degradation early on, which makes it possible to fix impending problems while they are small. This type of proactive surveillance operates by monitoring time-series data from sensors in power plant and grid components, wherein the time-series data includes various parameters, such as temperatures, vibrations, voltages and currents. This time-series data can be analyzed using prognostic-surveillance techniques to detect subtle degradation modes at the earliest incipience of the degradation.

Researchers have been investigating the possibility of using recently developed machine-learning (ML) techniques to perform such prognostic-surveillance operations for power plants and associated critical assets in the transmission and distribution grids. However, in order to develop these ML techniques, researchers need to be able to obtain real time-series data to evaluate the ML techniques in terms of quantitative performance metrics, the most important of which include: false-alarm probabilities (FAPs), missed-alarm probabilities (MAPs), sensitivity for anomaly discovery, "time-to-detection" (TTD) metrics for discovering subtle anomalies in large-scale time-series databases, and overall compute cost for various ML techniques.

Unfortunately, much of the time-series data associated with power generation, and transmission and distribution systems, which originates from utility companies and also smart meters in homes and businesses, has privacy contracts associated with it. Hence, a lengthy process is required to identify all privacy contracts that may be in place or may have been in effect at various times in the past, and then to obtain associated approvals to use such telemetry data for ML research purposes.

Hence, what is needed is a technique for developing machine-learning (ML) techniques to perform prognostic-surveillance operations on time-series data from power plants and associated power-distribution systems without the complications involved in dealing with privacy contracts associated with such time-series data.

SUMMARY

The disclosed embodiments relate to a system that facilitates development of machine-learning techniques to perform prognostic-surveillance operations on time-series data from a monitored system. During operation, the system receives original time-series signals comprising sequences of observations obtained from sensors in the monitored system. Next, the system decomposes the original time-series signals into deterministic and stochastic components. The system then uses the deterministic and stochastic components to produce synthetic time-series signals, which are statistically indistinguishable from the original time-series signals. Finally, the system enables a developer to use the synthetic time-series signals to develop machine-learning (ML) techniques to perform prognostic-surveillance operations on subsequently received time-series signals from the monitored system.

In some embodiments, using the synthetic time-series signals to develop the ML techniques to perform the prognostic-surveillance operations includes determining one or more of the following for the prognostic-surveillance operations: false-alarm probabilities (FAPs); missed-alarm probabilities (MAPs); sensitivity for anomaly discovery; time-to-detection (TTD) metrics for discovering anomalies; and overall compute cost for the ML techniques.

In some embodiments, the synthetic time-series signals have the same serial-correlation structure, cross-correlation structure, and stochastic content as the original time-series signals.

In some embodiments, the stochastic content includes one or more of the following: a mean; a variance; a skewness; a kurtosis; and Kolmogorov-Smirnov test statistics.

In some embodiments, if the original time-series signals include spikes, while producing the synthetic time-series signals, the system determines a temporal distribution, an amplitude distribution and a width distribution for the spikes in the original time-series signals. Next, the system includes synthetic spikes in the synthetic time-series signals, which have the same temporal distribution, amplitude distribution and width distribution as the spikes in the original time-series signals.

In some embodiments, if there exists a suspect pair of records, which have possibly reversed timestamps, in the original time-series signals, the system: trains an MSET model on the original time-series signals without the suspect pair of records; applies the trained MSET model to the original time-series signals to produce residuals $r_1$; applies the trained MSET model to the original time-series signals with the suspect pair of records reversed to produce residuals $r_2$; and if $r_1 > r_2$, reverses the suspect pair of records in the original time-series signals.

In some embodiments, producing the synthesized time-series signals involves using a telemetry-parameter simulation system (TPSS) technique, wherein the TPSS technique creates a high-fidelity synthesis equation, and then uses the high-fidelity synthesis equation to produce the synthetic time-series signals.

In some embodiments, using the TPSS technique to produce the synthetic time-series signals involves: using an autocorrelation technique to determine a longest period for each signal in the original time-series signals; selecting a portion of the original time-series signals that contains an integer number of periods; determining a number of Fourier modes $N_{mode}$, which equals a number of peaks in a spectral-density function for the original time-series signals; selecting the maximum $N_{mode}$ Fourier modes; and using the selected $N_{mode}$ Fourier modes to produce the synthetic time-series signals.

In some embodiments, the monitored system includes one or more of the following: a power plant; a power-distribution

DETAILED DESCRIPTION

Figure 1:
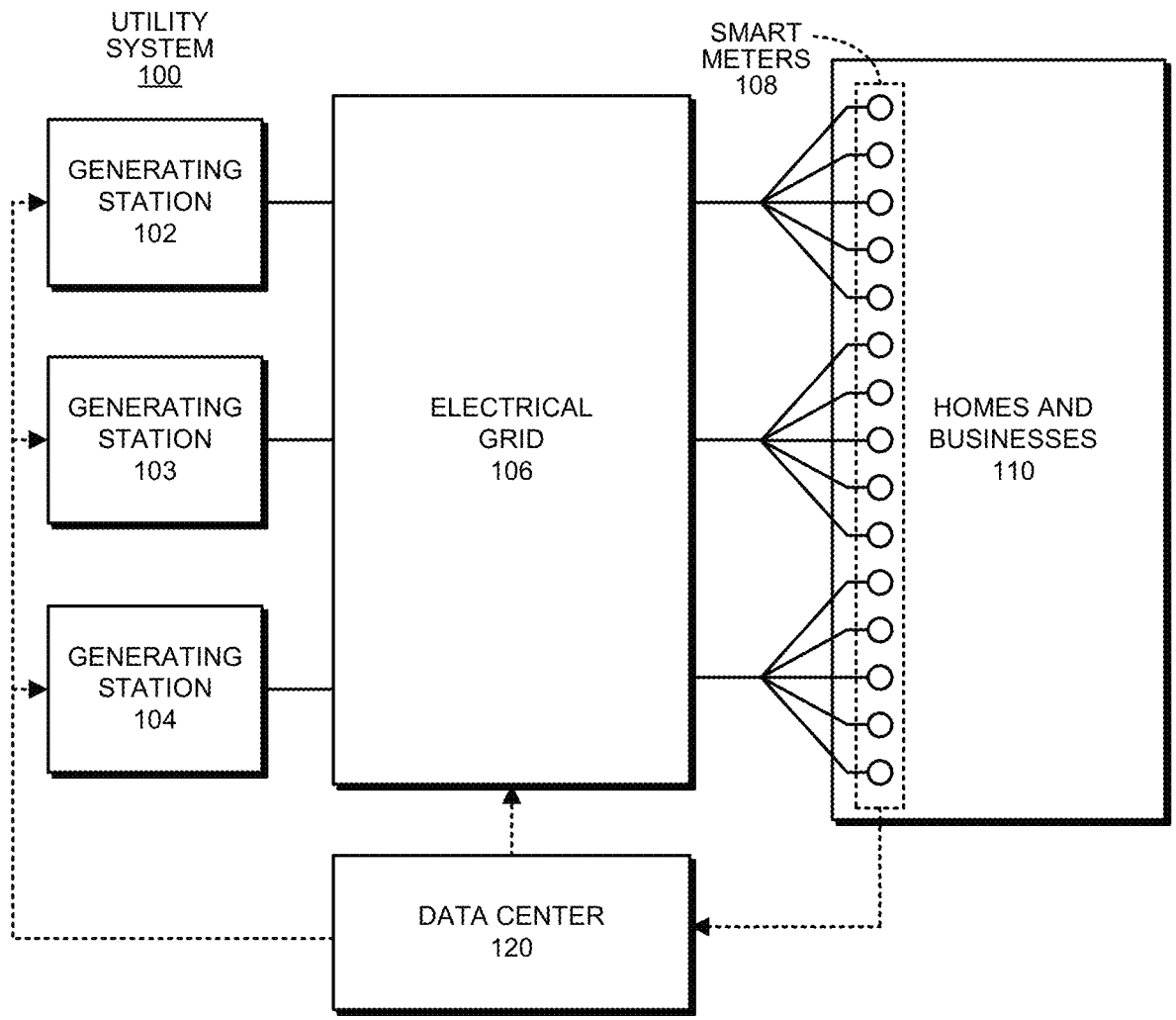
FIG. 1 illustrates an electrical utility system comprising a set of generating stations connected to homes and businesses through an electrical grid in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

OVERVIEW

A significant challenge for machine-learning (ML) research is obtaining "real" data for performance evaluation of new ML innovations, and for customer Proof-of-Concept (POC) demonstrations. It is often the case that the data that would be most valuable for ML performance evaluations and for POC demonstrations is covered by one or possibly multiple privacy contracts. The disclosed embodiments provide a technique that solves this problem, and in doing so, makes available for research teams vast databases of synthesized signals that are statistically indistinguishable from "real" signals, which will yield identical results when evaluated with any ML techniques that researchers would obtain from the "real" signals—with the important difference that the synthesized signals are unencumbered by privacy contracts.

The described technique is a synergistic integration of a number of innovations in a system that: processes any database of time-series signals; decomposes those signals into their deterministic and stochastic components; and synthesizes a new database of time-series signals that are statistically indistinguishable from the original signals. The synthesized signals can then be used by any ML and deep learning (DL) researchers to evaluate new ML/DL innovations in terms of quantitative performance metrics, the most important of which are the false-alarm probabilities (FAPs), missed-alarm probabilities (MAPs), sensitivity for anomaly discovery, and "time-to-detection" (TTD) metrics for discovering subtle anomalies in large-scale, time-series databases.

Hence, the disclosed embodiments provide a system that processes a database of time-series signals to produce an extremely high-fidelity synthetic database of time-series signals possessing the following characteristics.

(1) The synthetic signals are statistically indistinguishable from the original time-series signals. This means the synthesized time-series signals have exactly the same serial correlation structure, cross-correlation structure, and stochastic content (matching means, variance, skewness, kurtosis, and Kolmogorov-Smirnov statistic) as the original time-series signals.

(2) If any of the original time-series signals are contaminated by spikes, the corresponding synthetic signals also have spikes, which have the same temporal distribution, the same amplitude distribution, and the same width distribution as the original spikes.

(3) The system also handles reversed records. For one very important class of time-series databases associated with the smart-grid sensing and transmission technology, records are occasionally reversed in the data archive. Moreover, when this phenomenon of "record reversal" happens, it is by no means obvious to the trained eye of an experienced data scientist whether just the timestamps are reversed, or the timestamps and corresponding records are reversed. The new system first uses MSET to detect reversed records, and then to analytically disambiguate between reversals of only timestamps and reversals of both timestamps and corresponding data records. When the data records are reversed, a crucial step in the overall synthesis infrastructure is to correct the reversals before the time-series signals are processed to produce corresponding synthetic signals. Note that in the final synthesized database, the end user is given the option of having reversed records with a temporal frequency-of-occurrence that matches the reversed records from the original time-series database, or to have the optimally corrected data record ordering in the synthesized data.

By producing synthetic time-series signals, the new system enables researchers to perform the following analytical operations related to ML optimization:

(1) assessing false alarm probabilities (FAPs) for new ML techniques;
(2) assessing missed alarm probabilities (MAPs) for new ML techniques;
(3) assessing sensitivity and "time-to-detection" (TTD) metrics for discovery of subtle anomalies creeping into time-series processes; and
(4) assessing overall compute cost for various ML techniques.

Most importantly, the synthesized time-series database will not be encumbered by any privacy contracts associated with the original measured time-series signals. Although the statistics of the synthesized database versus the original database are the same, the new system can use double-precision math, which means that the probability that any individual data observation will match between the original data and the synthesized data is extremely remote, and the probability that a sequence of two observations would exactly match is estimated to be less than one in $10^{20}$.

Note that a related telemetry-parameter synthesis system (TPSS) technique was previously developed by one of the inventors. See "Spectral Decomposition and Reconstruction of Telemetry Signals from Enterprise Computing Systems," K. C. Gross and E. Schuster, Proc. 2005 IEEE International Multiconference in Computer Science & Computer Eng., Las Vegas, Nev. (June 2005). However, this previous TPSS technique was quite limited in scope, was developed and used for a completely different use case, and cannot be used for the challenge addressed by the new system. The original TPSS technique was developed to "filter the dynamics" from dynamic time-series signals, so the remaining residuals would be stationary with time, thereby making the residuals amenable to an anomaly detector technique called the Sequential Probability Ratio Test (SPRT). In contrast, the new technique solves a new and much broader challenge by using a different mix of innovations and a completely different dataflow structure.

The new system takes time-series signals and generates new synthesized time-series signals that will yield exactly the same quantitative conclusions when analyzed with ML techniques. The synthetic time-series signals generated by the new system meet all of the following functional requirements with respect to the original time-series signals:

(1) the same serial correlation structure;
(2) the same multivariate cross-correlation structure;
(3) the same stochastic structure, with all stochastic components matching in mean, variance, skewness, and kurtosis;
(4) the same "treble-attribute" distribution of spikes: distribution of inter-arrival times (IATs) for the spikes, distribution of spike amplitudes, and distribution of spike widths;
(5) the same temporal distribution of missing values; and
(6) detection and correction of reversed-record instances in the time-series database.

Before describing the new technique further, we first describe an exemplary utility system in which the new technique operates.

Exemplary Utility System

FIG. 1 illustrates an exemplary utility system 100 comprising a set of generating stations 102-104 connected to homes and businesses 110 through an electrical grid 106 in accordance with the disclosed embodiments. Although the utility system illustrated in FIG. 1 is presented as an exemplary monitored system that generates sensor data, the disclosed techniques for generating synthetic time-series signals are not meant to be limited to such utility systems. In general, the disclosed techniques can be applied to any type of monitored system that generates sensor data, such as: an enterprise computing system; a motorized vehicle; a factory; and an oil refinery.

Referring to FIG. 1, generating stations 102-104 can generally include any type of facility that generates electricity, such as a nuclear power plant, a solar power plant, or a coal-fired, natural gas or oil-burning power plant. Generating stations 102-104 connect into electrical grid 106, which can transfer electricity to homes and businesses 110 within a region served by utility system 100, and can also transfer electricity to and from other utility systems. Note that electrical grid 106 transfers electricity to homes and businesses 110 through individual smart meters 108, which periodically transmit AMI signals containing electrical usage data, including kilowatt measurements and kilowatt-hour measurements, to a data center 120.

A control system within data center 120 receives the AMI signals from smart meters 108 along with weather data, comprising historic, current and forecasted weather information, and produces a load forecast, which is used to control generating stations 102-104 and other operations of electrical grid 106.

Data Privacy Challenge

Figure 2:
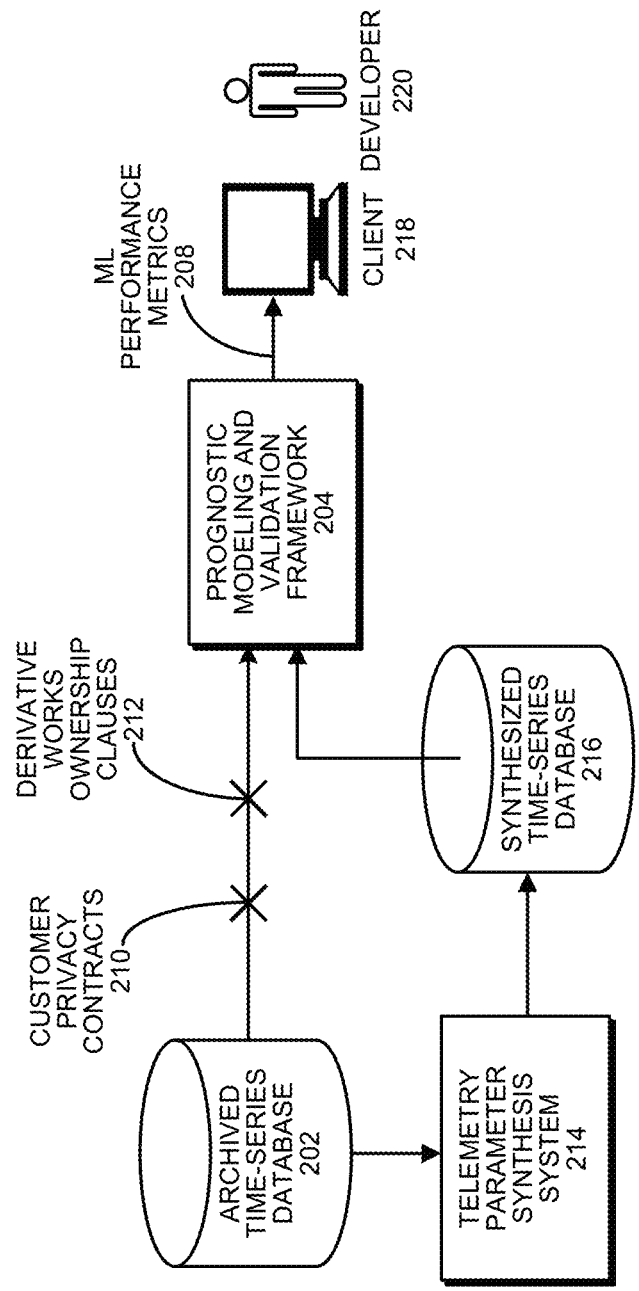
FIG. 2 illustrates the data privacy challenge and a corresponding synthetic signal solution in accordance with the disclosed embodiments.

FIG. 2 illustrates the data privacy challenge involved in processing time-series signals and a corresponding telemetry synthesis solution in accordance with the disclosed embodiments. As illustrated in FIG. 2, time-series signals obtained from an archived time-series database 202 can be fed into a prognostic modeling and validation framework 204 to produce ML performance metrics 208, which are viewed by a developer 220 through a client system 218. This enables developer 220 to optimize performance of the various ML innovations related to the time-series data.

However, as illustrated in FIG. 2 customer privacy contracts 210 and derivative works ownership clauses 212 can make it difficult or impossible to use time-series signals directly obtained from archived time-series database 202. So, instead of using the time-series signals directly, the time-series signals from archived time-series database 202 are fed through a telemetry-parameter synthesis system (TPSS) 214 to produce a synthesized time-series database 216, comprising synthetic time-series signals, which are statistically indistinguishable from the original time-series signals, but do not contain any of the data points in the original time-series signals. These synthetic signals are then fed into prognostic modeling and validation framework 204 to produce ML performance metrics 208 for developer 220.

Process of Producing Synthetic Time-Series Signals

Figure 3A:
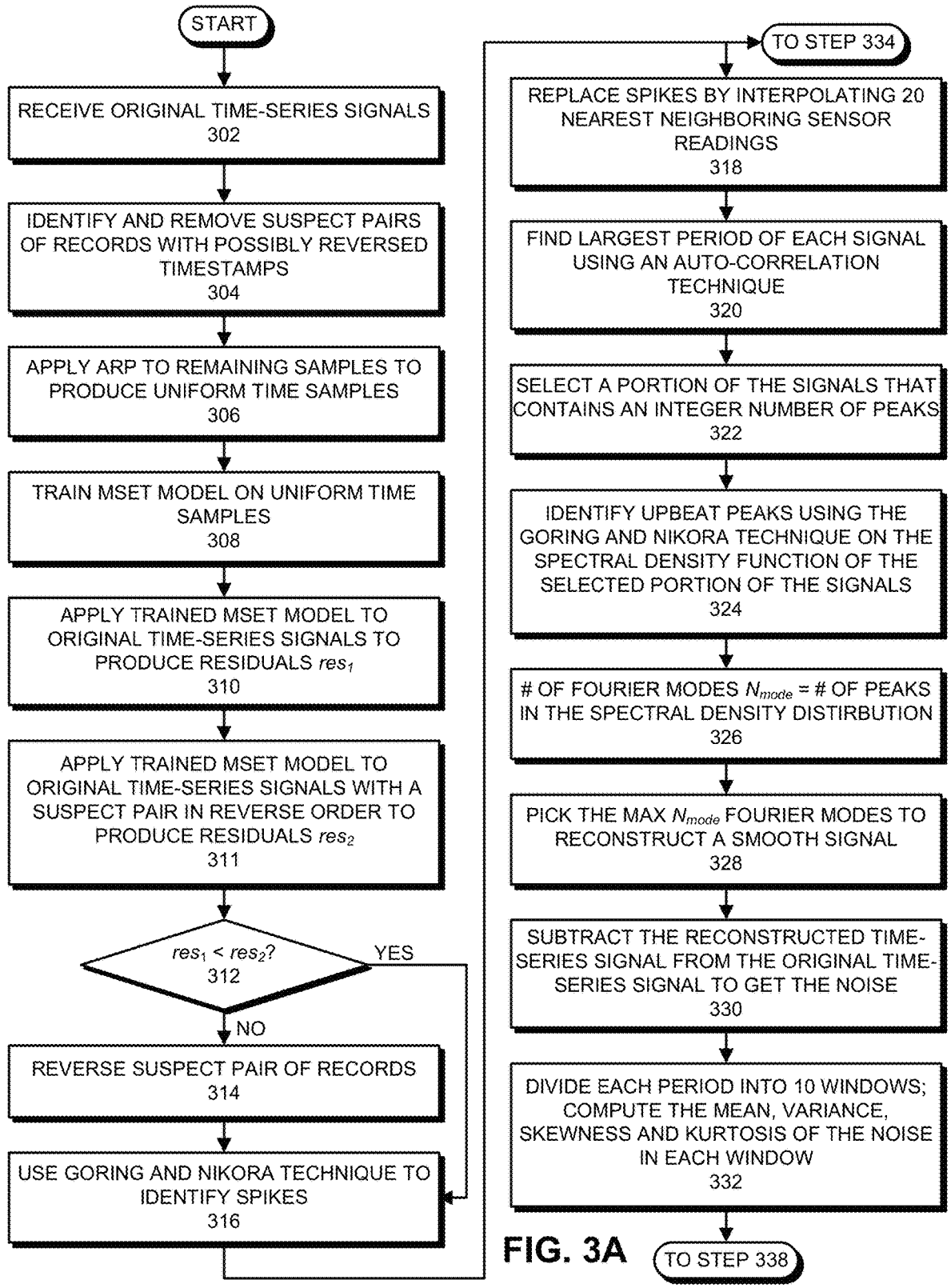
FIGS. 3A-3B present a flow chart illustrating the process of generating synthesized time-series signals in accordance with the disclosed embodiments.
Figure 3B:
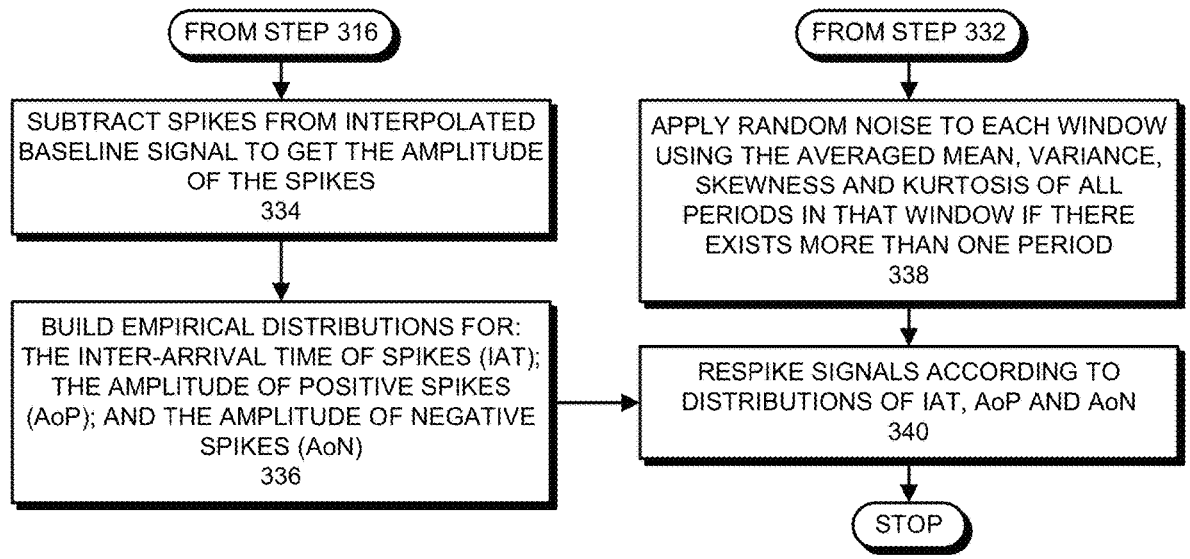

While producing the synthetic time-series signals, telemetry parameter synthesis system 214 performs the following operations, which are illustrated in the flow chart that appears in FIGS. 3A-3B. The system first receives the original time-series signals (step 302). Next, the system identifies and removes suspect pairs of records with possible reversed timestamps (step 304). The system then applies an analytical resampling process (ARP) to the remaining signals to produce uniform time samples (step 306). This process of analytically resampling and optimizing the telemetry data can involve using one or more of the techniques described in: "Barycentric Coordinate Technique for Resampling Quantized Signals," by inventors Sajit Thampy, Kenny C. Gross, and Keith A. Whisnant, having Ser. No. 11/210,570, and a filing date of 23 Aug. 2005, which is incorporated by reference herein.

Next, the system trains an MSET model on the uniform time samples (step 308). The system then applies the trained MSET model to the original time-series signals to produce residuals $res_1$ (step 310). The system also applies the trained MSET model to the original time-series signals with the suspect pair of records in reverse order to produce residuals $res_2$ (step 311). The system then determines whether abs($res_1$)<abs($res_2$) (step 312). If not (NO at step 312), the system reverses the suspect pair of records (step 314) and proceeds to use the Goring and Nikora technique to identify spikes in the time-series data (step 316). (See Goring, D. G., and Nikora, V. I. (2002). "Despiking Acoustic Doppler Velocimeter Data." J. Hydraul. Eng., 128(1), 117-126.) On the other hand, if abs($res_1$)<abs($res_2$) (YES at step 312), the system proceeds directly to step 314.

Figures 5A, 5B, 5C:
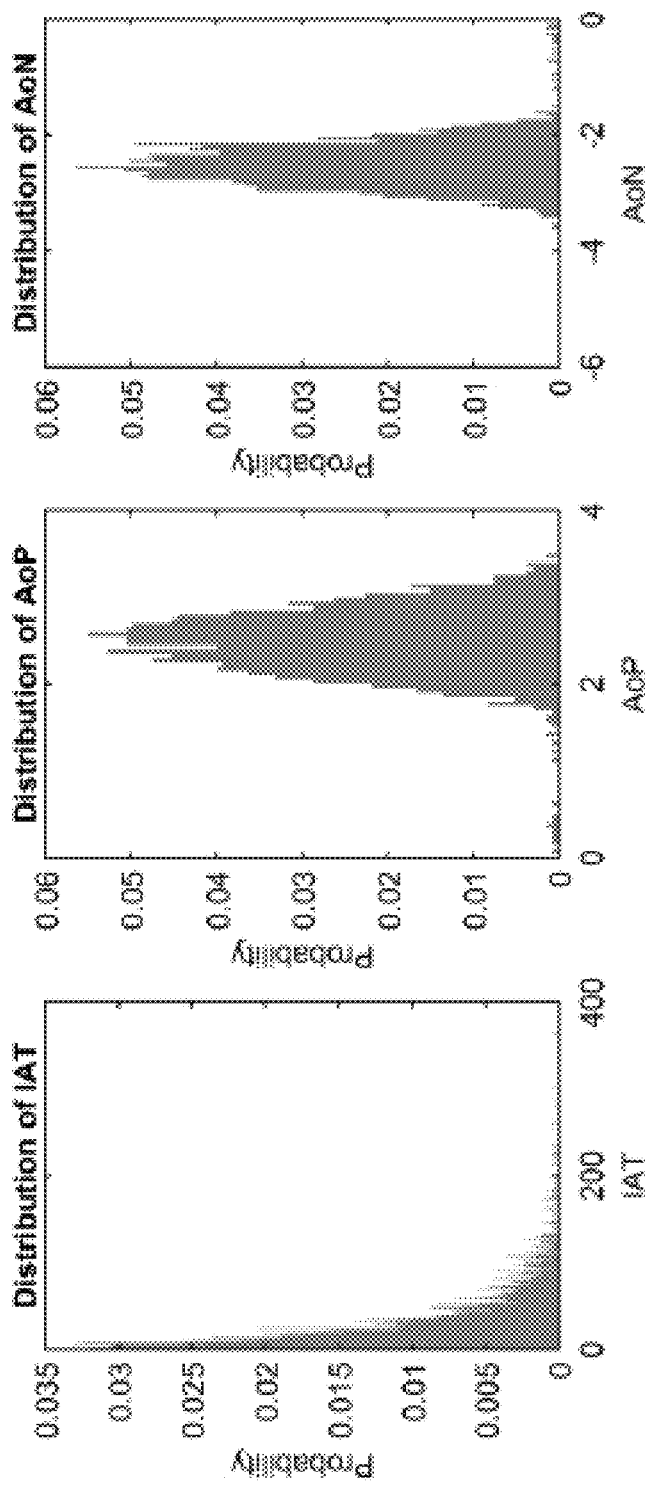
FIG. 5A illustrates a distribution of inter-arrival times (IATs) for spikes in accordance with the disclosed embodiments.
FIG. 5B illustrates a distribution for amplitudes of positive spikes (AoP) for spikes in accordance with the disclosed embodiments.
FIG. 5C illustrates a distribution for amplitudes of negative spikes (AoN) for spikes in accordance with the disclosed embodiments.

After the spikes are identified in step 316, the system replaces the data points for the spikes by interpolating the 20 nearest neighboring sensor readings (step 318). In a different parallel thread, the system proceeds to step 334, where the system subtracts spikes from the interpolated baseline signal to get the amplitude of the spikes (step 334). The system then builds empirical distributions for: the inter-arrival time of spikes (IAT); the amplitude of positive spikes (AoP); and the amplitude of negative spikes (AoN) (step 336). See FIGS. 5A, 5B and 5C, which illustrate exemplary distributions for IAT, AoP and AoN, respectively.

Figure 4:
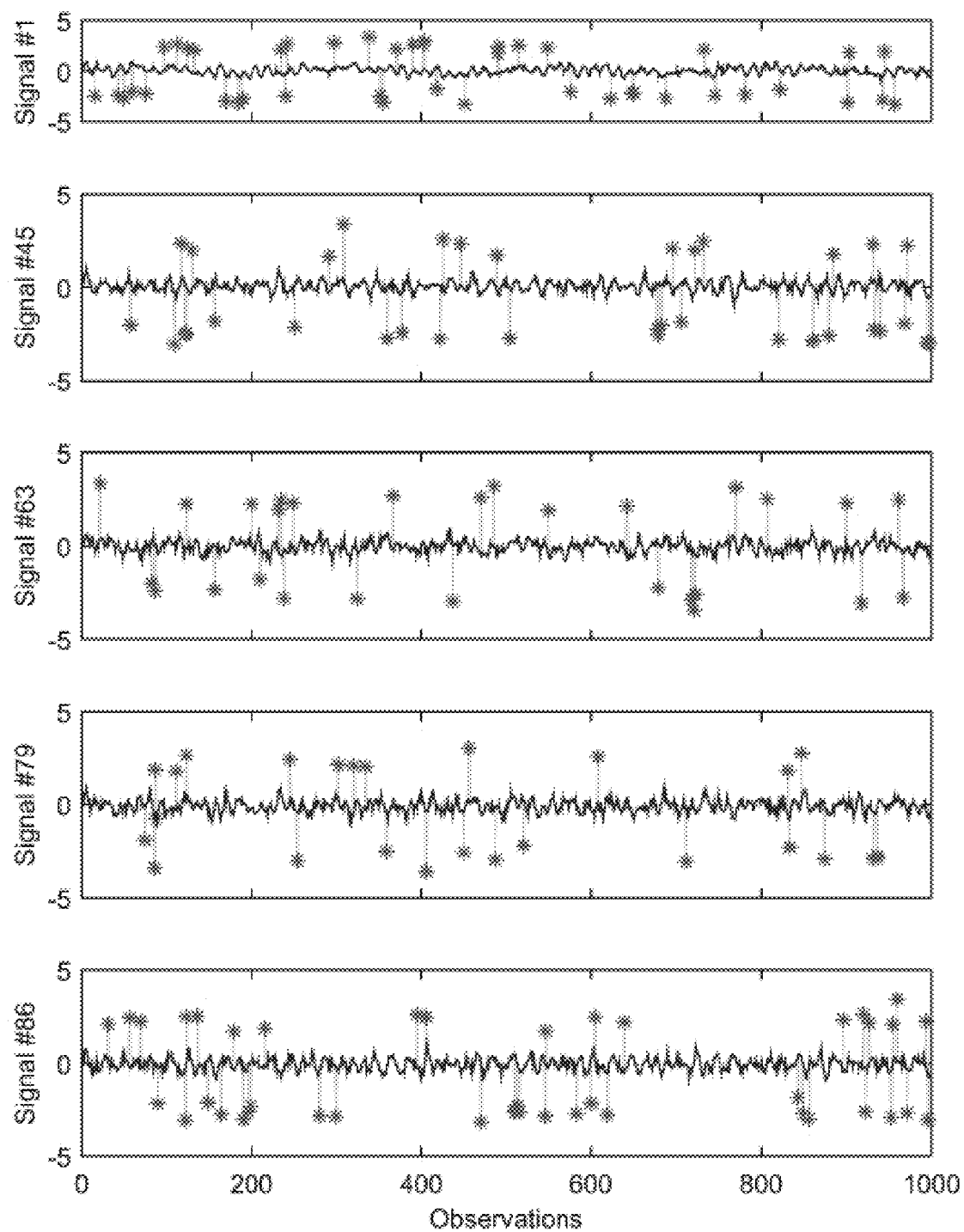
FIG. 4 presents graphs illustrating spikes and an associated baseline signal in accordance with the disclosed embodiments.

Back to the original thread, after step 318, the system finds the largest period of each signal using an auto-correlation technique (step 320). The system then selects a portion of the signals that contains an integer number of peaks (step 322). Next, the system identifies upbeat spikes using the Goring and Nikora technique on the selected portion of the signals (step 324). The system then determines a number of Fourier modes $N_{mode}$, which equals the number of peaks in the corresponding spectral density distribution (step 326). Next, the system picks the maximum $N_{mode}$ Fourier modes to reconstruct a smooth signal (step 328). The system then subtracts the reconstructed time-series signal from the original time-series signal to get the noise (step 330). Next, the system divides each period into 10 windows and computes the mean, variance, skewness and kurtosis of the noise in each window (step 332). The system then applies random noise to each window using the average mean, variance, skewness and kurtosis of all periods in the window if there exists more than one period (step 338). The system then respikes the signals according to the distributions of IAT, AoP and AoN computed in step 336. The synthetic time-series signals are now complete and the process terminates. As an example, FIG. 4 illustrates an exemplary set of 5 signals, wherein spikes are indicated by * symbols, the original spiky signal is represented by a thinner line, and the overlaid despiked signal is represented by a thicker line.

Record Reversal

We next describe details of the process for identifying and correcting records with reversed timestamps. For technical reasons that have to do with how power grid smart meters process electricity data readings, utility AMI signals have occasional "reversed records." In a simple example, suppose the sampling rate is every 15 minutes and that the record for 5:30 appears before the record for 5:15. Note that when this phenomenon of "record reversal" happens, it is by no means obvious to the trained eye of an experienced data scientist, whether just the timestamps are reversed, or the timestamps plus the data in the records are reversed.

The new system uses MSET to detect reversed records, and also to analytically disambiguate between reversals of timestamps and reversals of the data records themselves. As illustrated in FIG. 3A, to disambiguate between timestamp reversals and reversal of timestamps and the data contained in the records, we use a two-step process. We first temporarily "remove" the pair of suspect records. We then train an MSET model on the signals with all the suspect pairs removed. Note that if the time-series signals were random observations, then MSET would have no way of determining whether the "suspect pairs" are in the correct order, or are in a reverse order. However, for AMI signals, there is always some degree of serial correlation to the signals, not only because of diurnal and weekly patterns of electrical usage, but also because of cycles in the weather patterns. We leverage this underlying serial correlation by now running MSET with the suspect pairs inserted in the order in which they were reported. We then compute residuals with respect to the trained model without the suspect pairs. Next, we run MSET again with the suspect pairs in reverse order, and once again compute residuals. The approach that produces the smaller residuals is determined to be associated with the correct order of the records. Note that in the final synthesized database, the end user is given the option of having reversed records with a temporal frequency-of-occurrence that matches the reversed records from the original time-series database (if true high-fidelity is strictly adhered to, including data-acquisition flaws), or to have the optimally corrected data record ordering in the synthesized data.

Synthesizing Spikes

The record reversal operation is valuable in the subsequent Fourier decomposition and reconstruction of synthesized signals. However, the most important innovation in the new system is how spikes, both above the mean and below the mean (called upward and downward spikes), are accommodated. Note that the previously developed TPSS technique did nothing special for spikes, because that technique was solving a completely different problem. In the existing system, spikes in a time-series signal are very accurately replicated in the corresponding synthetic time-series signal. However, the spikes then have exactly the same temporal spacing and the same amplitudes, as those of the spikes in the original time-series signals. For the completely different use case of the new system, it is not desirable to reproduce exactly the same spikes, with exactly the same time spacing and amplitudes. We instead want the synthesized signals to have synthetic spikes with the same statistical distribution parameters as for spikes in the original time-series signals.

To this end, we have developed a new technique that: identifies all spikes and the times of occurrence of those spikes in the original time-series data; treats upward and downward spikes separately; computes the inter-arrival times (IATs) for both positive and negative spikes; computes the distribution of amplitudes for both positive and negative spikes; and computes the distribution of "widths" for the positive and negative spikes. The system then performs a "despiking" operation, which temporarily "fills in" the data points where the spikes are removed using optimal-value imputation. The despiked signals are then run through a spectral decomposition technique that separates the deterministic serially correlated components from the stochastic noise associated with the signals. For the deterministic components, the system decomposes the signals into an envelope of superimposed periodic waveforms. For the stochastic noise, an empirical distribution is constructed, for which the variance, skewness, and kurtosis are computed. The system then incorporates the above-listed six empirical distributions (IATs of spikes, distribution of positive spikes, distribution of negative spikes, distribution of positive amplitudes, distribution of negative amplitudes, distribution of spike widths) by using a synthesis technique that superimposes stochastic noise and spikes onto the envelopes of waveforms to produce a synthesized time-series database that possesses the same deterministic structure and stochastic idiosyncrasies as the original time-series database.

The system also associates AMI smart-meter readings with specific addresses for the end customers. During this process, the system tokenizes the customer account information for anonymization purposes. Also to anonymize the addresses, the system applies a geospatial mapping utility to convert all of the addresses into latitude/longitude coordinates, and then adds a sufficient offset to the coordinates to move the entire region spanned by the signals to a very large area with no residences, such as the middle of the Atlantic Ocean. Note that the "keys" for the account tokenization and for the latitude/longitude translation to the middle of the Atlantic Ocean remain inside the firewall with the original measured signals. Only the synthesized time-series database, with the anonymized account information and the translated latitude/longitude coordinates, leaves the firewall for use by ML research teams.

Process of Generating Synthesized Time-Series Signals

Figure 6:
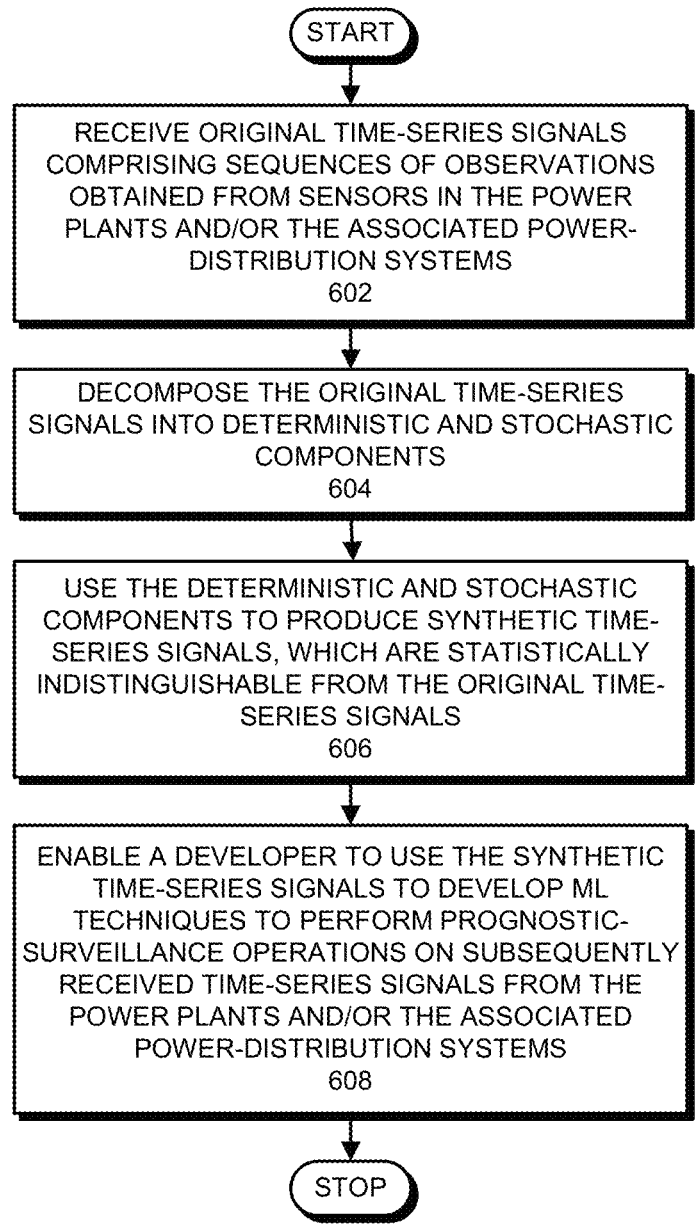
FIG. 6 presents a flow chart illustrating operations involved in generating and using synthesized time-series signals in accordance with the disclosed embodiments.

FIG. 6 presents a flow chart illustrating operations involved in generating and using synthesized time-series signals in accordance with the disclosed embodiments. During operation, the system receives original time-series signals comprising sequences of observations obtained from sensors in the power plants and/or the associated power-distribution systems (step 602). Next, the system decomposes the original time-series signals into deterministic and stochastic components (step 604). Then, system then uses the deterministic and stochastic components to produce synthetic time-series signals, which are statistically indistinguishable from the original time-series signals (step 606). Finally, the system enables a developer to use the synthetic time-series signals to develop ML techniques to perform prognostic-surveillance operations on subsequently received time-series signals (step 608).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating development of machine-learning techniques to perform prognostic-surveillance operations on time-series data from a monitored system, comprising:

receiving original time-series signals comprising sequences of observations obtained from sensors in the monitored system;

decomposing the original time-series signals into deterministic and stochastic components;

using the deterministic and stochastic components to produce synthetic time-series signals, which are statistically indistinguishable from the original time-series signals; and enabling a developer to use the synthetic time-series signals to develop machine-learning (ML) techniques to perform prognostic-surveillance operations on subsequently received time-series signals from the monitored system.

2. The method of claim 1, wherein using the synthetic time-series signals to develop the ML techniques to perform the prognostic-surveillance operations includes determining one or more of the following for the prognostic-surveillance operations:

false-alarm probabilities (FAPs);
missed-alarm probabilities (MAPs);
sensitivity for anomaly discovery;
time-to-detection (TTD) metrics for discovering anomalies; and
overall compute cost for the ML techniques.

3. The method of claim 1, wherein the synthetic time-series signals have the same serial-correlation structure, cross-correlation structure, and stochastic content as the original time-series signals.

4. The method of claim 1, wherein the stochastic content includes one or more of the following:

a mean;
a variance;
a skewness;
a kurtosis; and
Kolmogorov-Smirnov test statistics.

5. The method of claim 1, wherein if the original time-series signals include spikes, producing the synthetic time-series signals involves:

determining a temporal distribution, an amplitude distribution and a width distribution for the spikes in the original time-series signals; and including synthetic spikes in the synthetic time-series signals, which have the same temporal distribution, amplitude distribution and width distribution as the spikes in the original time-series signals.

6. The method of claim 1, wherein if there exists a suspect pair of records, which have possibly reversed timestamps, in the original time-series signals, the method further comprises:

training an MSET model on the original time-series signals without the suspect pair of records;

applying the trained MSET model to the original time-series signals to produce residuals $r_1$;

applying the trained MSET model to the original time-series signals with the suspect pair of records reversed to produce residuals $r_2$; and if $r_1 > r_2$, reversing the suspect pair of records in the original time-series signals.

7. The method of claim 1, wherein producing the synthesized time-series signals involves using a telemetry parameter synthesis (TPSS) technique, wherein the TPSS technique creates a high-fidelity synthesis equation, and then uses the high-fidelity synthesis equation to produce the synthetic time-series signals.

8. The method of claim 7, wherein using the TPSS technique to produce the synthetic time-series signals includes:
   using an autocorrelation technique to determine a longest period for each signal in the original time-series signals;
   selecting a portion of the original time-series signals that contains an integer number of periods;
   determining a number of Fourier modes $N_{mode}$, which equals a number of peaks in a spectral-density function for the original time-series signals;
   selecting the maximum $N_{mode}$ Fourier modes; and
   using the selected $N_{mode}$ Fourier modes to produce the synthetic time-series signals.

9. The method of claim 1, wherein the monitored system includes one or more of the following:
   a power plant;
   a power-distribution system;
   an enterprise computing system;
   a motorized vehicle;
   a factory; and
   an oil refinery.

10. A non-transitory computer-readable storage medium storing instructions that when executed by a computer cause the computer to perform a method for facilitating development of machine-learning techniques to perform prognostic-surveillance operations on time-series data from a monitored system, the method comprising:
   receiving original time-series signals comprising sequences of observations obtained from sensors in the monitored system;
   decomposing the original time-series signals into deterministic and stochastic components;
   using the deterministic and stochastic components to produce synthetic time-series signals, which are statistically indistinguishable from the original time-series signals; and
   enabling a developer to use the synthetic time-series signals to develop machine-learning (ML) techniques to perform prognostic-surveillance operations on subsequently received time-series signals from the monitored system.

11. The non-transitory computer-readable storage medium of claim 10, wherein using the synthetic time-series signals to develop the ML techniques to perform the prognostic-surveillance operations includes determining one or more of the following for the prognostic-surveillance operations:
   false-alarm probabilities (FAPs);
   missed-alarm probabilities (MAPs);
   sensitivity for anomaly discovery;
   time-to-detection (TTD) metrics for discovering anomalies; and
   overall compute cost for the ML techniques.

12. The non-transitory computer-readable storage medium of claim 10, wherein the synthetic time-series signals have the same serial-correlation structure, cross-correlation structure, and stochastic content as the original time-series signals.

13. The non-transitory computer-readable storage medium of claim 10, wherein the stochastic content includes one or more of the following:
   a mean;
   a variance;
   a skewness;
   a kurtosis; and
   Kolmogorov-Smirnov test statistics.

14. The non-transitory computer-readable storage medium of claim 10, wherein if the original time-series signals include spikes, producing the synthetic time-series signals involves:
   determining a temporal distribution, an amplitude distribution and a width distribution for the spikes in the original time-series signals; and
   including synthetic spikes in the synthetic time-series signals, which have the same temporal distribution, amplitude distribution and width distribution as the spikes in the original time-series signals.

15. The non-transitory computer-readable storage medium of claim 10, wherein if there exists a suspect pair of records, which have possibly reversed timestamps, in the original time-series signals, the method further comprises:
   training an MSET model on the original time-series signals without the suspect pair of records;
   applying the trained MSET model to the original time-series signals to produce residuals $r_1$;
   applying the trained MSET model to the original time-series signals with the suspect pair of records reversed to produce residuals $r_2$; and
   if $r_1 > r_2$, reversing the suspect pair of records in the original time-series signals.

16. The non-transitory computer-readable storage medium of claim 10, wherein producing the synthesized time-series signals involves using a telemetry parameter synthesis (TPSS) technique, wherein the TPSS technique creates a high-fidelity synthesis equation, and then uses the high-fidelity synthesis equation to produce the synthetic time-series signals.

17. The non-transitory computer-readable storage medium of claim 16, wherein using the TPSS technique to produce the synthetic time-series signals includes:
   using an autocorrelation technique to determine a longest period for each signal in the original time-series signals;
   selecting a portion of the original time-series signals that contains an integer number of periods;
   determining a number of Fourier modes $N_{mode}$, which equals a number of peaks in a spectral-density function for the original time-series signals;
   selecting the maximum $N_{mode}$ Fourier modes; and
   using the selected $N_{mode}$ Fourier modes to produce the synthetic time-series signals.

18. The non-transitory computer-readable storage medium of claim 10, wherein the monitored system includes one or more of the following:
   a power plant;
   a power-distribution system;
   an enterprise computing system;
   a motorized vehicle;
   a factory; and
   an oil refinery.

19. A system that facilitates development of machine-learning techniques to perform prognostic-surveillance operations on time-series data from a monitored system, comprising:
   at least one processor and at least one associated memory; and
   a development mechanism that executes on the at least one processor, wherein during operation, the development mechanism:
      receives original time-series signals comprising sequences of observations obtained from sensors in the monitored system;

decomposes the original time-series signals into deterministic and stochastic components;

uses the deterministic and stochastic components to produce synthetic time-series signals, which are statistically indistinguishable from the original time-series signals; and enables a developer to use the synthetic time-series signals to develop machine-learning (ML) techniques to perform prognostic-surveillance operations on subsequently received time-series signals from the monitored system.

20. The system of claim 19, wherein while using the synthetic time-series signals to develop the ML techniques to perform the prognostic-surveillance operations, the system determines one or more of the following for the prognostic-surveillance operations:

false-alarm probabilities (FAPs);

missed-alarm probabilities (MAPs);

sensitivity for anomaly discovery;

time-to-detection (TTD) metrics for discovering anomalies; and overall compute cost for the ML techniques.

* * * * *